Patented Dec. 13, 1949            2,490,967

UNITED STATES PATENT OFFICE 2,490,967

AZO DYESTUFFS

Otto Kaiser, Dornach, Switzerland, assignor to Ciba Limited, Basel, Switzerland, a firm No Drawing. Application December 4, 1946, Serial No. 713,935. In Switzerland December 14, 1945

8 Claims. (Cl. 260—157)

According to this invention new azo-dyestuffs are made by coupling a tetrazotized diamino-dibenzimidazole of the general formula

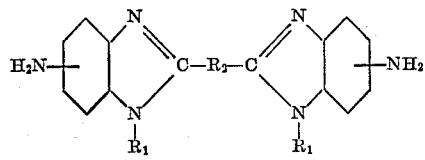

whose benzene nuclei may be further substituted and in which $R_1$ represents alkyl, arakyl, cycloalkyl or hydrogen, and $R_2$ represents a divalent hydrocarbon radical containing at least two carbon atoms, with a pyrazolone.

Diamino-dibenzimidazoles of the above general formula have not hitherto been described. They can be obtained by methods in themselves known. As starting materials for their preparation there may be used, for example, dibenzimidazoles of the general formula

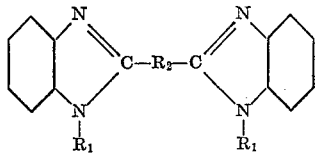

in which $R_1$ and $R_2$ have the meanings given above. $R_1$ may represent, for example, hydrogen, ethyl, methyl, benzyl or cyclohexyl, and $R_2$ may represent, for example, the following radicals:

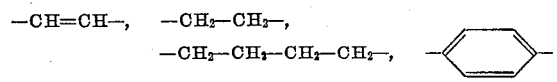

Such dibenzimidazoles have already been described. They are prepared, for example, by the condensation of an ortho-phenylene diamine with a dicarboxylic acid or a functional derivative thereof, such as an anhydride or acid chloride, see for example U. S. patent applications Serial No. 515,024, filed December 20, 1943, now Patent No. 2,463,264, and Serial No. 581,964, filed March 9, 1945, and Examples 1 and 2 herein.

The resulting dibenzimidazole is nitrated by a method in itself known, and the resulting nitro-derivative is converted into an amine. The amino groups in the resulting diamino-dibenzimidazole occupy the same positions as the nitro-groups in the dinitro-dibenzimidazole obtainable by nitration from the corresponding dibenzimidazole of the general formula

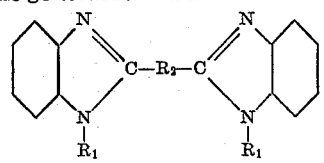

The dibenzimidazoles or their nitro or amino derivatives may, if desired, be converted into sulfonic acids by subjecting them to the action of sulfonating agents such as chlorosulfonic acid, for example at a raised temperature.

The majority of the thus obtained diaminodibenzimidazoles, such as are mentioned in the following examples, are easily soluble in dilute hydrochloric acid, so that they can be tetrazotized easily in an aqueous medium. By coupling the new tetrazo compounds with pyrazolones there are obtained, depending on the choice of the components, principally dyestuffs which yield yellow to orange tints. They are quite generally distinguished by a pronounced affinity for cellulose fibers.

The same products are obtained if, instead of tetrazotizing the diamino-dibenzimidazoles, these are first, for instance, acylated on one side, then diazotized, and coupled, whereupon, after splitting off the acyl radical, the second amino group is diazotized and another coupling is effected. Quite generally, the dyestuffs of the present invention are obtained if diazo compounds derived from the diamino-dibenzimidazoles of the above formula are combined with pyrazolones.

Depending upon the use of sulfated or unsulfated tetrazo components, the coupling components are so chosen that sufficient groups imparting solubility, that is to say, sulfo-groups or carboxyl groups, are present in the dyestuff molecule. For this purpose two of the aforesaid groups imparting solubility are sufficient.

Among the very large number of pyrazolones suitable for the present invention the following may be mentioned: 5 - pyrazolone - 3 - carboxylic acid, 3-methyl-5-pyrazolone, 1-phenyl-3-methyl-5-pyrazolone, 1-phenyl-5-pyrazolone-3-carboxylic acid, 1-(4'- or 3'-sulfo)-phenyl-3-methyl - 5 - pyrazolone, 1 - (3' - nitro) - phenyl - 5-pyrazolone-3-carboxylic acid, 1-(1':5'-disulfo)-2 - naphthyl - 3 - methyl - 5 - pyrazolone, 1 - (4' - hydroxy - 3' - carboxy) - phenyl - 5 - pyrazolone - 3-carboxylic acid, 1-(2'-chloro-5'-sulfo)-phenyl-3-methyl-5-pyrazolone or the like.

By the new process, symmetrical or asymmetrical azo-dyestuffs can be produced, depending upon the use of 2 mols of one component per mol of tetrazo-compound or of 1 mol each of two different components.

Especially valuable are the dyestuffs obtained by using as coupling components 1-aryl-5-pyrazolones which contain a diazotizable amino group as a substituent in the aryl radical. Among such coupling components there may be mentioned, for example: 1-(3'-amino)-phenyl-5-pyrazolone-3-carboxylic acid, 1-(4'-amino)-phenyl-5-pyrazolone-3-carboxylic acid, 1 - [3'-(3''-aminobenzoylamino)] - phenyl - 5 - pyrazolone - 3 - carboxylic acid, 1 - [4' - (4'' - amino - diphenyl - 4''' - carboxy - amino)] - phenyl - 5 - pyrazolone - 3 - carboxylic acid, and 1-(4''-amino-2'':2'-disulfo)-stilbene - 3 - methyl - 5 - pyrazolone. With these components dyestuffs are obtained which yield yellow to red dyeings and which can be diazotized on the fiber and developed, for example, with β-naphthol or a pyrazolone. In this manner valuable, powerful dyeings can be obtained which are distinguished by excellent properties of wet fastness.

The dyestuffs obtainable by the present invention correspond to the general formula.

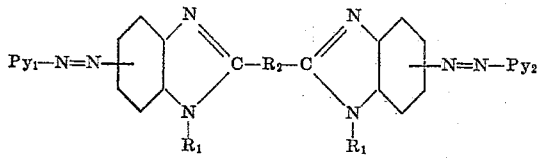

whose benzene nuclei may be further substituted and in which $R_1$ represents hydrogen or alkyl, $R_2$ represents a divalent hydrocarbon radical, and $Py_1$ and $Py_2$ each represent a pyrazolone radical.

The following examples serve to illustrate the invention, although the number of examples could be considerably extended to include the other coupling components hereinbefore mentioned. The parts and percentages are by weight.

Example 1

660 parts of o-phenylene diamine are heated with 116 parts of fumaric acid within 3 to 5 hours from 120 to 160° C. with exclusion of the air. As soon as the elimination of water slackens, the temperature is raised to about 190° C. and maintained for a short time at 190–195° C. until water no longer escapes. The whole is allowed to cool and the o-phenylene diamine in excess removed by extraction with alcohol, benzene or another solvent. The residue is dissolved in hot dilute hydrochloric acid, and the condensation product precipitated from the solution by means of an alkaline agent, e. g. with ammonia, filtered, and washed neutral with water. It may be further purified via the hydrochloride. It may also be obtained in a pure state via the sodium salt from an alcoholic sodium hydroxide solution.

The new product of the formula

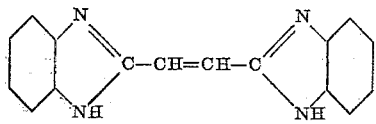

forms an almost colorless powder which is insoluble to sparingly soluble in water and in the usual organic solvents. It is taken up by dilute hot hydrochloric acid to form a weakly yellowish colored solution.

The $\alpha:\beta$-di-[benzimidazyl-(2)]-ethane of the formula

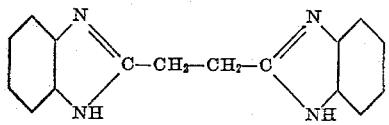

can be made in a similar way by using succinic acid as starting material.

Example 2

16.6 parts of terephthalic acid are heated with 70 parts of ortho-phenylene diamine and 0.5 part of boric acid within about 6 hours to 190° C. while excluding the air. The temperature of 190–195° C. is maintained until the elimination of water has ceased, whereupon the reaction mixture is allowed to cool, and the ortho-phenylene diamine in excess removed by extraction with alcohol. The residue is then dried.

The 1:4-di-[benzimidazyl-(2)]-benzene thus obtained of the formula

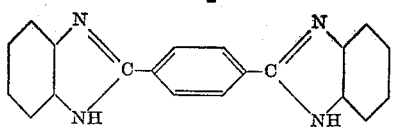

forms a bright powder which, when dissolved for instance in alcohol, shows a blue-violet fluorescence in ultraviolet light.

Example 3

29.2 parts of $\alpha:\beta$-di-[6'-amino-benzimidazyl-(2')]-ethane of the formula

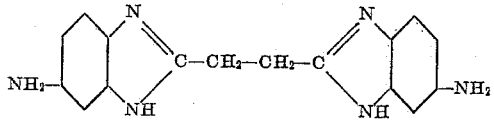

are dissolved in 500 parts of water with the aid of 57.5 parts of concentrated hydrochloric acid, and then mixed with ice and tetrazotized at 0° C. with 13.8 parts of sodium nitrite. The clear tetrazo-solution is introduced into a solution, cooled with ice, of 43.8 parts of 1-(3'-aminophenyl)-5-pyrazolone-3-carboxylic acid and 60 parts of sodium carbonate in 1000 parts of water, and the whole is thoroughly stirred for 4 hours. At the end of this period the coupling mixture is heated to 80° C. and the dyestuff formed is precipitated with 75 parts of sodium chloride, filtered and dried.

The new dyestuff is a red powder. It dyes cotton from an alkaline bath orange tints. By diazotization and development with 2-hydroxynaphthalene on the fiber there is obtained a bright, powerful, yellow-red dyeing which is fast to washing and light.

The $\alpha:\beta$-di-[6'-amino-benzimidazyl-(2')]-ethane used as starting material in this Example may be prepared as follows:

52.4 parts of $\alpha:\beta$-[dibenzimidazyl-(2')]-ethane are dissolved in 200 parts of sulfuric acid monohydrate at 30–35° C., nitrated at 0–5° C. with a mixture of approximately equal parts of concentrated sulfuric acid and concentrated nitric acid, which mixture contains 26 parts of $HNO_3$, and the nitration mixture is poured on to ice and filtered. The dinitro compound so obtained is stirred in 3000 parts of water with 100 parts of iron powder and 400 parts of hydrochloric acid of 30 per cent. strength for 20 hours at the boil, and then the solution is filtered to remove residual iron. The hydrochloride of the resulting diamine can be precipitated by the addition of concentrated hydrochloric acid.

By using in the above example, instead of 29.2 parts of $\alpha:\beta$-di-[6'-amino-benzimidazyl-(2')]-ethane, 32.0 parts of $\alpha:\beta$-di-[amino-N-methyl-benzimidazyl-(2')]-ethane (obtainable by dinitrating $\alpha:\beta$-di-[N-methyl-benzimidazyl-(2')]-ethane and reducing the nitro-groups by the method described above) and in other respects following the procedure described above, there is obtained a dyestuff which also dyes cotton orange-red tints, which by diazotization on the fiber and development with 2-hydroxynaphthalene yield somewhat redder dyeings than those obtained with the first-mentioned dyestuff. With the dyestuff obtained from 29.0 parts of $\alpha:\beta$-di-[6'-amino-benzimidazyl-(2')]-ethylene by the procedure described in the above example there are produced dyeings which when diazotized on the fiber and developed with 2-hydroxynaphthalene are somewhat more yellow; and the dyestuff from 31.8 parts of $\alpha:\beta$-di-[amino-N-methylbenzimidazyl-(2')]-ethylene (obtainable by dinitrating α:β-di-[N-methyl-benzimidazyl-(2')]-ethylene and reducing the nitro-groups by the method described above) yields somewhat redder dyeings after being diazotized on the fiber and coupled with 2-hydroxynaphthalene.

Dyestuffs with similar properties are obtained if, in lieu of the above mentioned diamino-dibenzimidazoles, their sulfonic acids are used as starting materials.

*Example 4*

29.2 parts of α:β-di-[6'-amino-benzimidazyl-(2')]-ethane of the formula

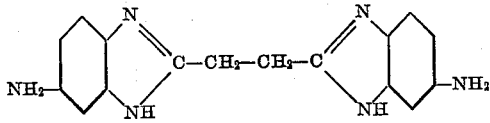

are dissolved in 500 parts of water with the aid of 57.5 parts of concentrated sulfuric acid, mixed with ice, and tetrazotized at 0° C. with 13.8 parts of sodium nitrite. The clear tetrazo-solution is introduced into a solution, cooled with ice, of 50.8 parts of 1-(4'-sulfo)-phenyl-3-methyl-5-pyrazolone and 60 parts of sodium carbonate in 1000 parts of water, and the whole is thoroughly stirred for 4 hours. At the end of this period the coupling mixture is heated to 80° C. and the dyestuff formed is precipitated with 75 parts of sodium chloride, filtered and dried. The new dyestuff is a pale brown powder, which dyes cotton from an alkaline bath reddish-yellow tints.

*Example 5*

34 parts of 1:4-di-[6'-amino-benzimidazyl-(2')]-benzene of the formula

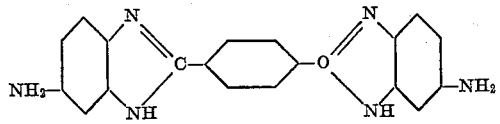

(obtainable from 1:4 - di - [benzimidazyl - (2')]-benzene by dinitration and reduction by the methods described in Example 3) are dissolved in 500 parts of water with the aid of 60 parts of hydrochloric acid of 30 per cent. strength, the clear solution is cooled to 0° C. by means of ice, and then tetrazotized with a solution of 13.8 parts of sodium nitrite. The clear tetrazo solution is stirred into an ice-cold solution of 58 parts of 1-(2'-chloro-5'-sulfo)-phenyl-5-pyrazolone-3-carboxylic acid, which contains an excess of sodium carbonate. When the coupling is complete the mixture is heated to 60° C., and the rather sparingly soluble dyestuff is easily separated by filtration. When dry it is an orange powder which dyes cotton full, orange tints which are fast to water.

*Example 6*

A dyebath is prepared consisting of 1000 parts of water, 0.5 part of the dyestuff obtained as described in the first paragraph of Example 3, 1 part of anhydrous sodium carbonate and 15 parts of crystalline sodium sulfate, and 50 parts of cotton are entered at 40–50° C., the bath is slowly brought to the boil, and dyeing is carried on for about 1 hour. The material is then rinsed.

The orange dyeing so obtained is entered into a further cold bath containing 2.5 per cent. of sodium nitrite and 7.5 per cent. of concentrated hydrochloric acid calculated on the weight of the fiber. The goods are treated in the bath for 15–20 minutes, rinsed for a short time with cold water, and introduced into a developing bath which contains in 1000 parts of water 0.5 part of β-naphthol and 0.5 part of caustic soda solution of 30 per cent. strength. The cotton is treated in the bath for 15–20 minutes, rinsed and soaped, if desired, a second time at 50° C. in order to enhance the fastness to washing. The cotton is dyed a fast yellow-red tint.

Having thus disclosed the invention, what I claim is:

1. The azo-dyestuff of the formula

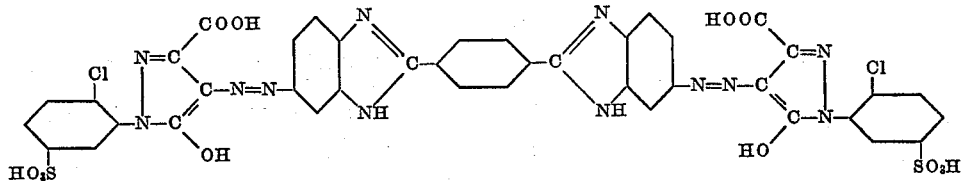

2. The azo-dyestuff of the formula

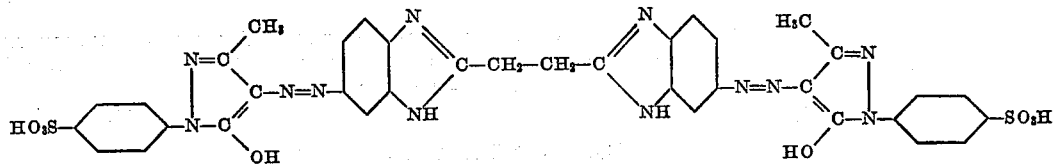

3. The azo-dyestuff of the formula

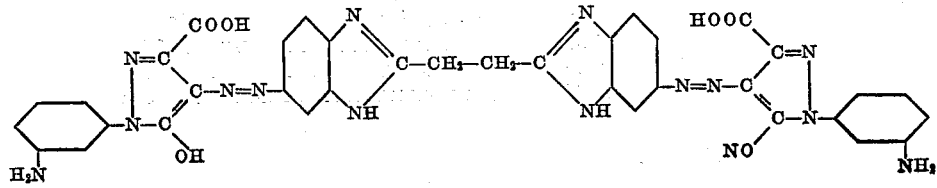

4. An azo dyestuff of the formula

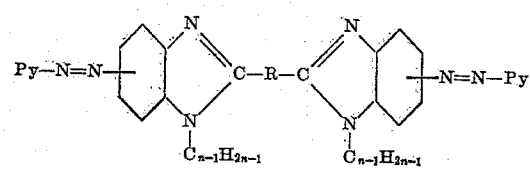

wherein $n$ stands for an integer, —R— stands for a member selected from the group consisting of the radicals —CH=CH—, —CH$_2$—CH$_2$—, —CH$_2$—CH$_2$—CH$_2$—CH$_2$—,

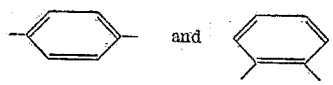

and Py stands for a pyrazolone radical containing at least one member of the group consisting of —SO$_3$H and —COOH, which azo dyestuff is prepared by dinitrating a dibenzimidazole of the formula

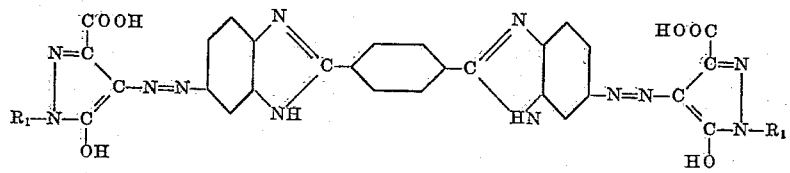

wherein $n$ and R have the meanings given above, converting the nitro groups into —NH$_2$-groups, tetrazotizing the resulting diamino-compound and coupling it with a pyrazolone containing at least one substituent of the group consisting of —SO$_3$H and —COOH.

5. An azo dyestuff of the formula

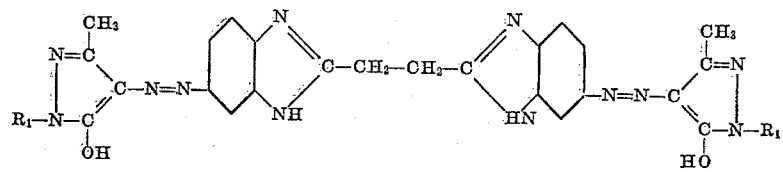

wherein $R_1$ stands for a mononuclear aromatic radical of the benzene series.

6. An azo dyestuff of the formula

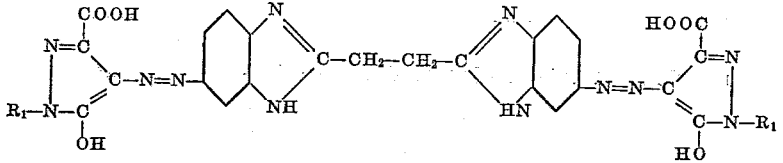

wherein $R_1$ stands for a mononuclear aromatic radical of the benzene series containing an —SO$_3$H group.

7. An azo dyestuff of the formula

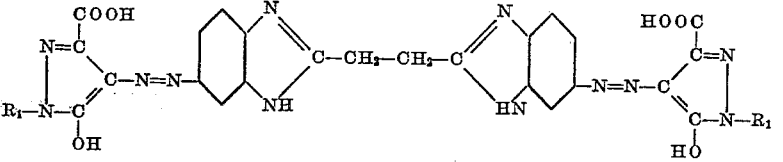

wherein $R_1$ stands for a mononuclear aromatic radical.

8. An azo dyestuff of the formula wherein $R_1$ stands for a mononuclear aromatic radical of the benzene series containing an —NH$_2$ group.

OTTO KAISER.

REFERENCES CITED

The following references are of record in the file of this patent:

FOREIGN PATENTS

| Number | Country | Date |
| --- | --- | --- |
| 70,983 | Germany | Aug. 24, 1893 |
| 2,721 | Great Britain | of 1908 |
| 90,844 | Switzerland | Sept. 16, 1921 |

Certificate of Correction

Patent No. 2,490,967                                                 December 13, 1949

OTTO KAISER

It is hereby certified that errors appear in the printed specification of the above numbered patent requiring correction as follows:

Column 1, line 11, for "arakyl" read *aralkyl*; columns 5 and 6, lower right-hand portion of the last formula, for and that the said Letters Patent should be read with these corrections therein that the same may conform to the record of the case in the Patent Office.

Signed and sealed this 4th day of April, A. D. 1950.

[SEAL]

THOMAS F. MURPHY,
*Assistant Commissioner of Patents.*